US011207827B2

(12) United States Patent
Addington et al.

(10) Patent No.: US 11,207,827 B2
(45) Date of Patent: Dec. 28, 2021

(54) ENERGY DOSING FOR ADDITIVE MANUFACTURING

(71) Applicant: HEWLETT-PACKARD DEVELOPMENT COMPANY, L.P., Houston, TX (US)

(72) Inventors: Cary G. Addington, Corvallis, OR (US); David A. Champion, Corvallis, OR (US); Mohammed S. Shaarawi, Corvallis, OR (US); James McKinnell, Corvallis, OR (US); Diane R. Hammerstad, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 633 days.

(21) Appl. No.: 16/074,805

(22) PCT Filed: Mar. 29, 2017

(86) PCT No.: PCT/US2017/024788
§ 371 (c)(1),
(2) Date: Aug. 2, 2018

(87) PCT Pub. No.: WO2018/182596
PCT Pub. Date: Oct. 4, 2018

(65) Prior Publication Data
US 2021/0053278 A1 Feb. 25, 2021

(51) Int. Cl.
*B29C 64/153* (2017.01)
*B33Y 10/00* (2015.01)
(Continued)

(52) U.S. Cl.
CPC .......... *B29C 64/153* (2017.08); *B29C 64/268* (2017.08); *B29C 64/282* (2017.08);
(Continued)

(58) Field of Classification Search
CPC .... B29C 64/153; B29C 64/277; B29C 64/282
See application file for complete search history.

(56) References Cited

U.S. PATENT DOCUMENTS

| 5,393,482 A | 2/1995 | Benda et al. |
| 6,007,764 A | 12/1999 | Benda et al. |
| (Continued) | | |

FOREIGN PATENT DOCUMENTS

| DE | 102011087374 | 5/2013 |
| DE | 102013201629 | 7/2014 |
| (Continued) | | |

OTHER PUBLICATIONS

Pomell et al., "Adaptive Selective Laser Sintering Testing Device for Process Research in 3D Printing", Retrieved from Internet: http://innomet.ttu.ee/daaam15/Proceedings/Mechatronics&System%20Engineering/pomell.pdf, May 12-13, 2015, 6 pages.

*Primary Examiner* — Marc C Howell
*Assistant Examiner* — John J DeRusso
(74) *Attorney, Agent, or Firm* — Dierker & Kavanaugh PC

(57) ABSTRACT

In one example, a processor readable medium having instructions thereon that when executed cause an additive manufacturing machine to vary operating characteristics of a fusing laser beam at multiple different voxel locations in a layer of build material according to an energy dosage to be applied at each voxel location in an object slice, including multiple different energy dosages for corresponding multiple different voxel locations in the slice.

14 Claims, 11 Drawing Sheets

(51) Int. Cl.
*B33Y 30/00* (2015.01)
*B33Y 50/02* (2015.01)
*B29C 64/282* (2017.01)
*B29C 64/393* (2017.01)
*B29C 64/268* (2017.01)

(52) U.S. Cl.
CPC ............ *B29C 64/393* (2017.08); *B33Y 10/00* (2014.12); *B33Y 30/00* (2014.12); *B33Y 50/02* (2014.12)

(56) References Cited

U.S. PATENT DOCUMENTS

| | | |
|---|---|---|
| 8,206,637 B2 | 6/2012 | Dietrich et al. |
| 9,422,187 B1 | 8/2016 | Bankaitis et al. |
| 2013/0300035 A1* | 11/2013 | Snis ........................ B22F 10/20 264/497 |
| 2014/0076749 A1 | 3/2014 | Hernandez et al. |
| 2014/0271328 A1* | 9/2014 | Burris .................... B33Y 10/00 419/53 |
| 2016/0074937 A1 | 3/2016 | Nassar et al. |
| 2019/0193329 A1* | 6/2019 | Haraguchi .............. B22F 10/20 |
| 2020/0038953 A1* | 2/2020 | Pavan ................... B29C 64/393 |

FOREIGN PATENT DOCUMENTS

| | | |
|---|---|---|
| RU | 2212982 C2 | 9/2003 |
| WO | 2015120168 A1 | 8/2015 |
| WO | 2015197794 A1 | 12/2015 |
| WO | 2016085965 A1 | 6/2016 |
| WO | 2016164729 A1 | 10/2016 |
| WO | WO-2017015241 | 1/2017 |

* cited by examiner

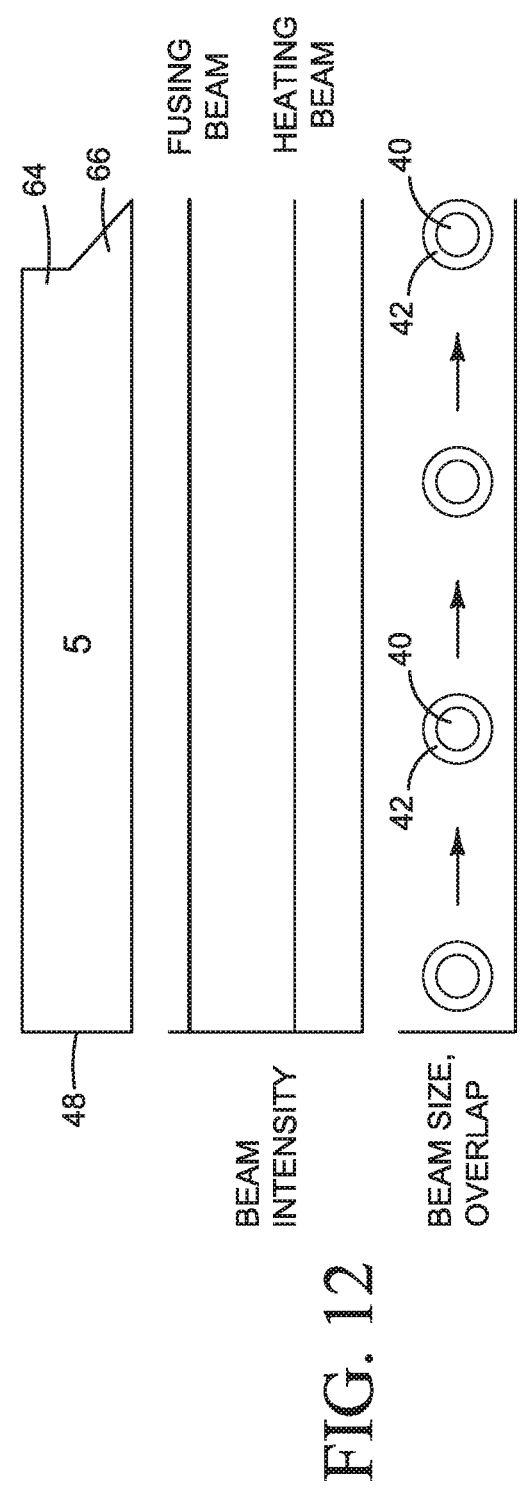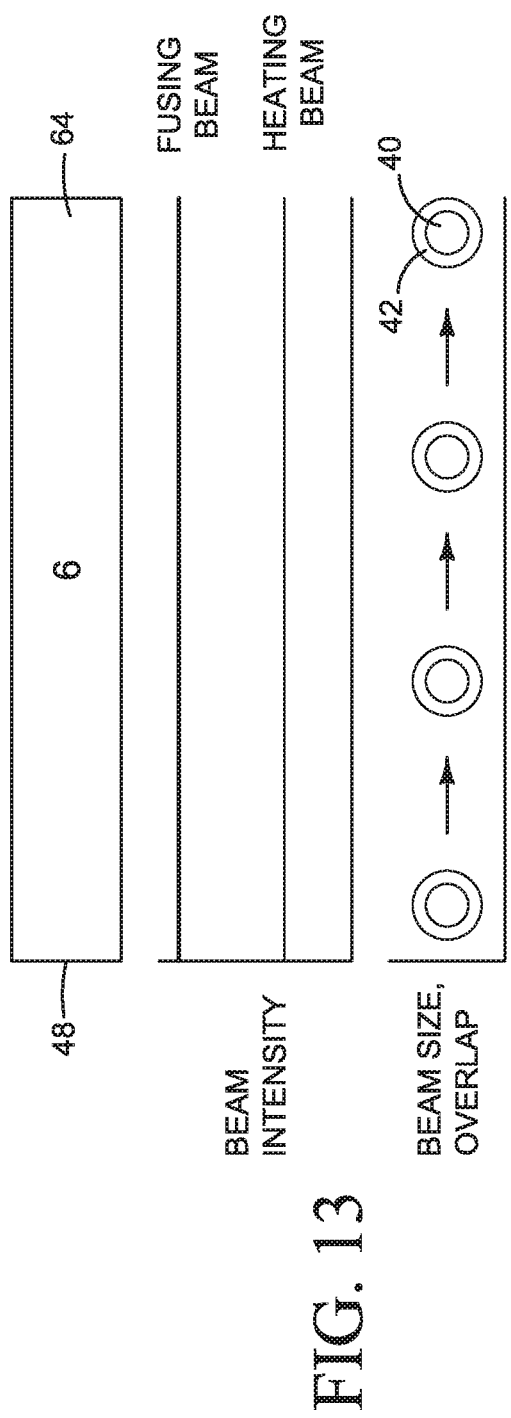

ENERGY DOSING FOR ADDITIVE MANUFACTURING

BACKGROUND

Additive manufacturing machines produce 3D objects by building up layers of material. Some additive manufacturing machines are commonly referred to as "3D printers." 3D printers and other additive manufacturing machines make it possible to convert a CAD (computer aided design) model or other digital representation of an object into the physical object. The model data may be processed into slices each defining that part of a layer or layers of build material to be formed into the object.

DRAWINGS

FIG. 6 also includes a graph illustrating one example for an energy dose to be applied across the object.

Figure 7:
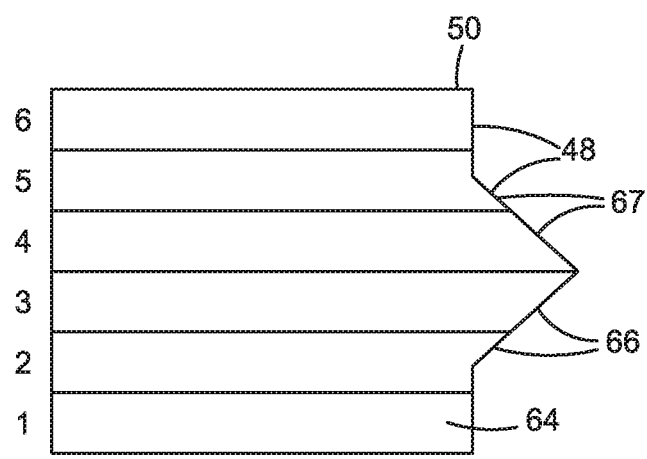
FIG. 7 is an elevation view illustrating one example for the front of the object shown in FIG. 6 divided into six slices.

FIGS. 8-13 each illustrate one of the object slices from FIG. 7 in more detail. Each of FIGS. 8-13 also includes graphs illustrating one example for beam intensity, size and position to be applied across the corresponding slice during manufacturing.

FIGS. 14-18 illustrate example techniques and components that may be used to help deliver the desired energy dosages at different voxel locations according to energy values associated with the corresponding object voxels.

The same part numbers designate the same or similar parts throughout the figures. The figures are not necessarily to scale.

DESCRIPTION

In some additive manufacturing processes, heat is used to fuse together the particles in a powdered build material to form a solid object. Heat to fuse the build material may be generated, for example, by scanning a laser beam on to a thin layer of build material to melt, sinter or otherwise fuse build material in a pattern corresponding to the desired shape of a slice of the object. The process is repeated layer by layer and slice by slice to complete the object. Laser fusing processes may use multiple laser beams that overlap one another at the build material. For example, a lower intensity heating beam surrounding a smaller, higher intensity fusing beam may be used to pre-heat build material before fusing energy is applied with the fusing beam, or to allow fused build material to cool more slowly after fusing energy is applied with the fusing beam, or both, to help develop the desired characteristics in the fused material.

A new technique has been developed to more effectively utilize overlapping laser beams for additive manufacturing. In one example, the operating characteristics of one or both of a fusing laser beam and a heating laser beam are varied at multiple different voxel locations in a layer of build material according to an energy dosage to be applied at each voxel location in an object slice, including multiple different energy dosages for corresponding multiple different voxel locations in the slice. In additive manufacturing, a voxel may be used to represent an element of volume in a three dimensional space. Each voxel contains information about the object volume at that location in space. A "voxel location" as used in this document refers to a physical location in the build material corresponding to the location of a voxel in the digital representation of the object being manufactured.

In one example of the new technique, an additive manufacturing process includes varying the intensity, spot size, and/or overlap of the laser beams at multiple different voxel locations according to an energy value associated with each voxel of the object being manufactured. Each energy value may represent an energy dosage to be applied to the unfused build material with the laser beams at a particular voxel location. Accordingly, energy dosing may be controlled at the voxel level to help optimize the manufacturing process for material characteristics and to help minimize thermal distortion along high resolution areas such as edges, overhangs, tapers, internal corners and high aspect ratio vertical structures. Spectral or thermal feedback (or both) from the manufacturing area may be used to change energy dosing "on the fly" for more precise control.

Although these and other examples are described with reference to multiple laser beams, examples may also be implemented to control a single, fusing laser beam. These and other examples shown in the figures and described below illustrate but do not limit the scope of the patent, which is defined in the Claims following this Description.

As used in this document, "and/or" means one or more of the connected things; a "processor readable medium" means any non-transitory tangible medium that can embody, contain, store, or maintain instructions and other information for use by a processor and may include, for example, circuits, integrated circuits, ASICs (application specific integrated circuits), hard drives, random access memory (RAM), read-only memory (ROM), and flash memory; and "work area" means any suitable structure to support or contain build material for fusing, including underlying layers of build material and in-process slice and other object structures.

Figure 1:
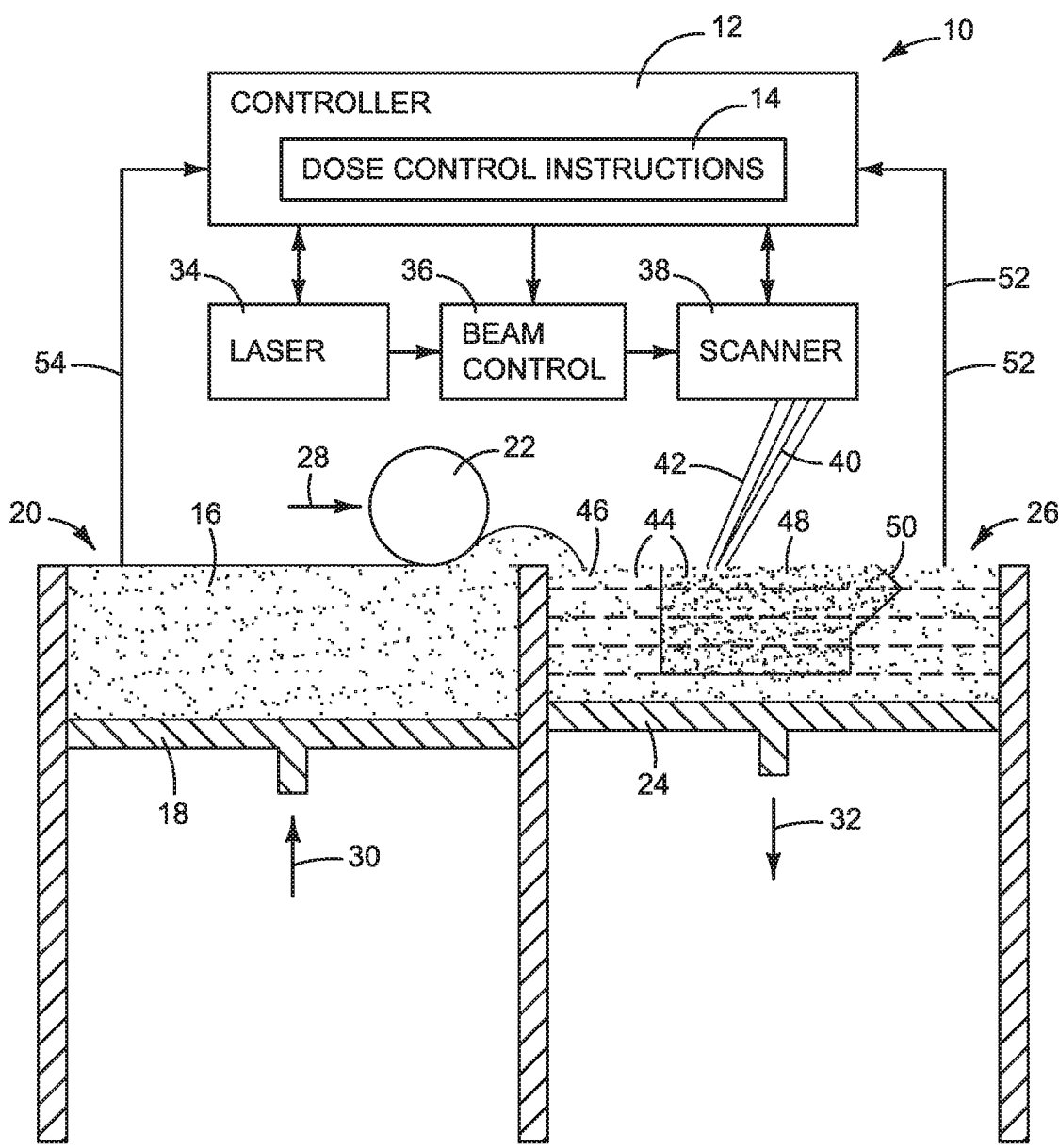
FIG. 1 illustrates one example of an additive manufacturing machine implementing a controller with energy dose control instructions.

FIG. 1 illustrates one example of an additive manufacturing machine 10 implementing a controller 12 with energy dose control instructions 14. Referring to FIG. 1, a supply of powdered build material 16 is held on a delivery piston 18 in a supply bed 20. A roller or other suitable layering device 22 moves build material 16 from supply bed 20 to a receiving piston 24 in a manufacturing bed 26, as indicated by arrow 28. Pistons 18 and 24 move up and down as build material 16 is moved from supply bed 18 to manufacturing bed 24, as indicated by arrows 30, 32. Any suitable build material 16 may be used to make the desired solid object, which may be hard or soft, rigid or flexible, elastic or inelastic. Also, while a powdered build material 16 is depicted by stippling in this example, suitable non-powdered build materials could also be used.

Additive manufacturing machine 10 also includes a laser 34, a beam control system 36, and a scanner 38 to scan laser beams 40, 42 over a work area 44. As noted above, work area 44 represents any suitable structure to support or contain build material 16 for fusing, including underlying layers of build material and in-process slice and other object structures. In this example, a smaller size, higher intensity fusing laser beam 40 is scanned on to a layer 46 of build material in work area 44 at the direction of controller 12 in a pattern corresponding to the desired shape of an object slice 48. Fusing beam 40 delivers a sufficient dose of energy to melt, sinter, or otherwise fuse build material in layer 46 into an object slice 48, according to dose control instructions 14. Also, in this example, a larger size, lower intensity heating laser beam 42 overlaps fusing beam 40 to pre-heat unfused build material before fusing laser 40 and/or to post-heat fused build material after fusing laser 40, according to dose control instructions 14.

The process is repeated layer by layer and slice by slice until the object is completed. In FIG. 1, successive layers 46 of unfused build material and the corresponding slices 48 of fused build material for a partially completed object 50 are depicted by dashed lines in FIG. 1 for illustration only—the very thin individual layers are not distinguishable within the bulk of unfused build material and the correspondingly thin slices fuse to the underlying fused build material. Controller 12 represents the processor (or multiple processors), the associated memory (or multiple memories) and instructions, and the electronic circuitry and components needed to control the operative elements of machine 10. In addition to executing dose control instructions 14, controller 12 may receive feedback from work area 44 and build material supply bed 20 during manufacturing, as indicated by lines 52 and 54 in FIG. 1. For example, spectral and/or thermal feedback from work area 44 and density, humidity and/or thermal feedback from build material supply 20 may be used by instructions 14 to modify energy values and the corresponding laser dosing "on the fly" for improved quality.

Beam control system 36 represents power modulation and optical elements to control the characteristics of beams 40, 42 including, for example, intensity, spot size and spot position. Scanner 38 may be implemented, for example, as a two dimensional "X, Y" scanner where a third dimension in "Z" is controlled by the position of piston 24. Although a single laser 34 is shown, multiple lasers may be used. FIG. 1 illustrates just one example configuration for an additive manufacturing machine 10 to implement energy dose control. Other suitable configurations are possible.

Energy dose control instructions 14 enable controller 12 to vary the operating characteristics of one or both of a fusing laser beam 40 and a heating laser beam 42 at multiple different voxel locations in a layer 46 of build material according to an energy dosage to be applied at each voxel location in an object slice 48, including multiple different energy dosages for corresponding multiple different voxel locations in the slice. In one example, each energy dosage is represented by an energy value associated with each voxel of slice 48. Energy values representing a desired energy dosage may be associated with the corresponding object voxels, for example, by an additive manufacturing controller 12, by the CAD model, or through an object model processor or other programming resource between the CAD model and the machine controller. In another example, each energy dosage is assigned to a corresponding voxel location by controller 12, for example according to a look up table or algorithm. The look up table or algorithm may embody an association between one or more voxel values and the desired energy dosage to be delivered at the corresponding voxel locations.

Energy values may be associated individually voxel by voxel, or by associating an energy value with a group of voxels, or both individual and group associations may be used. For example, energy values for fusing a bulk region of an object may be associated to the corresponding group of voxels representing that bulk while energy values for fusing edge regions may be associated with the corresponding voxels individually or in smaller groups.

Figure 2:
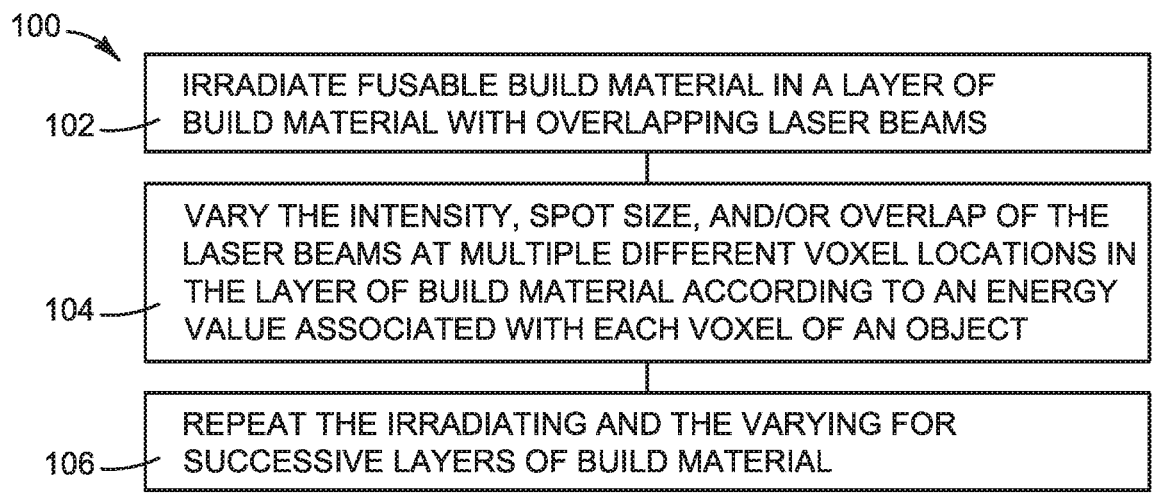
FIG. 2 is a flow diagram illustrating one example of an additive manufacturing process, such as might be implemented with the additive manufacturing machine shown in FIG. 1.

FIG. 2 is a flow diagram illustrating one example of an additive manufacturing process 100, such as might be implemented with a machine 10 shown in FIG. 1. Referring to FIG. 2, fusible build material in a layer of fusible build material is irradiated with overlapping laser beams (block 102). The intensity, spot size, and/or overlap of the laser beams is varied at multiple different voxel locations in the layer of build material according to an energy value associated with each voxel of an object, including multiple different values for corresponding multiple different voxels (block 104). The irradiating at block 102 and the varying at block 104 are repeated for successive layers of build material (block 106). Irradiating the build material at block 102 in FIG. 1 usually will include scanning the laser beams over the build material. Thus, the speed at which the laser beams are scanned over the build material may also (or alternatively) be varied at different voxel locations at block 104 according to the energy value for each voxel.

Figure 3:
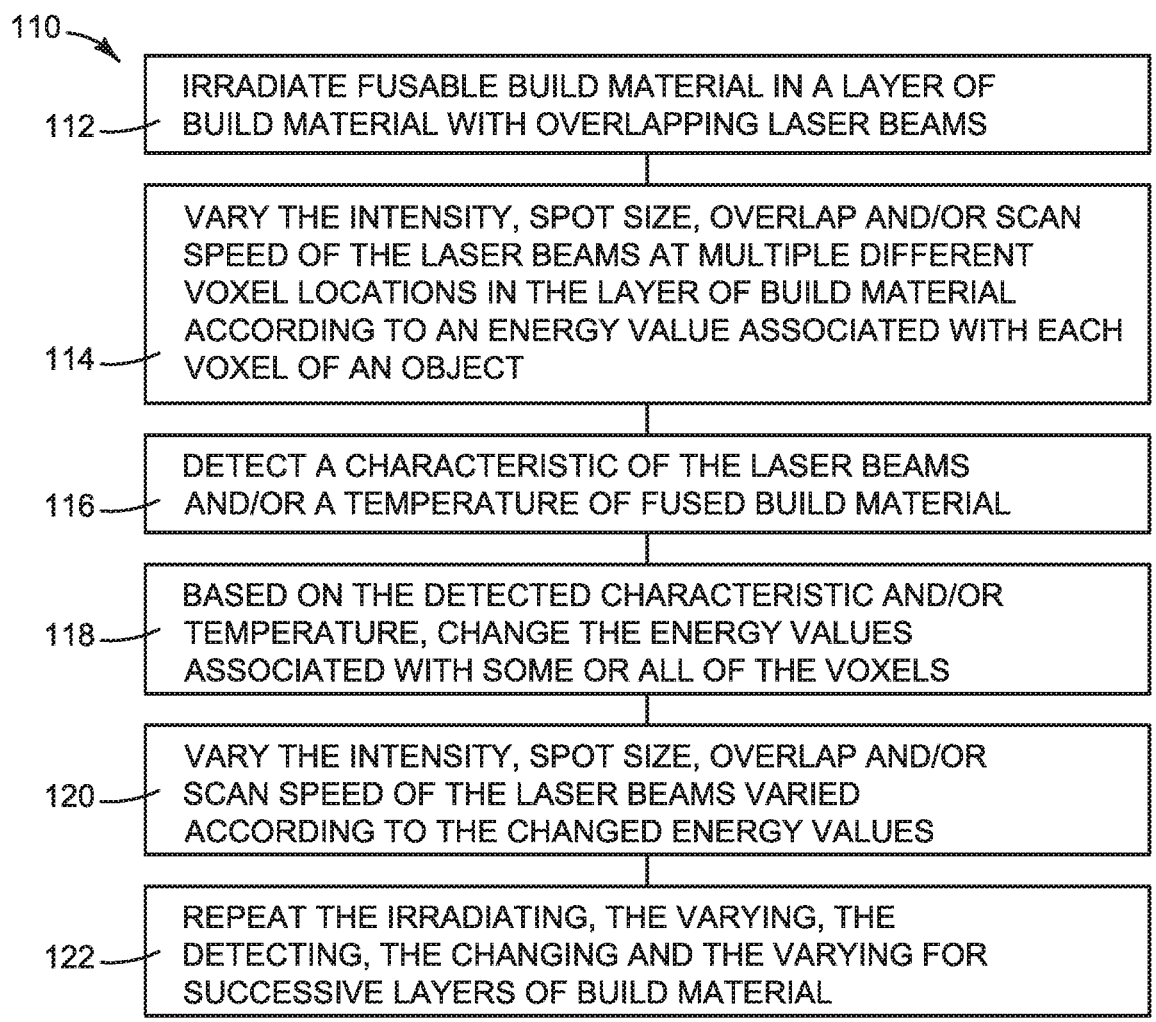
FIG. 3 is a flow diagram illustrating another example of an additive manufacturing process, such as might be implemented with the additive manufacturing machine shown in FIG. 1.

In another example, shown in FIG. 3, spectral and/or thermal feedback from the work area 44 is used to modify energy values during manufacturing. Referring to FIG. 3, an additive manufacturing process 110 includes irradiating build material with overlapping laser beams (block 112), varying intensity, spot size, overlap, and/or scan speed of the laser beams at different voxel locations in the build material according to an energy value associated with each voxel (block 114), detecting a characteristic of the laser beams and/or a temperature of fused build material (block 116) and, based on the detecting, changing the energy values associated with some or all of the voxels (block 118). The intensity, spot size, overlap and/or scan speed of the laser beams is then varied according to the changed energy values (block 120). The irradiating at block 112, the varying at block 114, the detecting at block 116, the changing at block 118 and the varying at block 120 are repeated for successive layers of build material (block 122).

As noted above, each energy value represents an energy dosage to be applied at the corresponding voxel location. The energy dosage describes a fusing energy to be delivered to the build material at each voxel (e.g., the optical intensity of the lasers (W/cm$^2$)× beam area (cm$^2$)× duration (s)). The energy value may represent the energy dosage directly or indirectly, for example through an algorithm or other functional association or derivation. Energy values may be associated with the voxels as part of CAD modeling for an object, when object slice data is generated (if slicing is performed independently from CAD modeling), or when control data is created for the additive manufacturing machine. Although the energy dosage represented by each energy value may be assigned in the CAD model, when object slice data is generated, or when control data is created for the additive manufacturing machine, it is expected that the energy dosage itself will be generated when control data is rendered by (or for) the additive manufacturing machine. For example, a post processor in the machine controller may overlay the desired thermal profile on to an object slice to adjust energy dosing at each voxel location according to the thermal profile.

Figure 4:
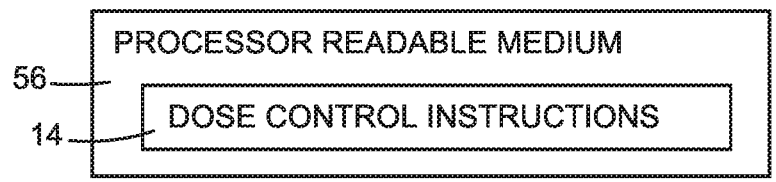
FIG. 4 is a block diagram illustrating a processor readable medium with energy dose control instructions.

FIG. 4 is a block diagram illustrating a processor readable medium 56 with energy dose control instructions 14. For one example, instructions 14 may include instructions to execute process 100 in FIG. 2. For another example, instructions 14 may include instructions to execute process 110 in FIG. 3. Processor readable medium 56 with energy dose control instructions 14 may be implemented, for example, in a CAD computer program product, in an object model processor, and/or in a controller for an additive manufacturing machine. Process control data to vary the intensity, spot size, overlap, and/or scan speed of the laser beams at different voxel locations according to the associated energy values may be generated before manufacturing begins and during manufacturing "on the fly", for example, by dose control instructions 14 on an additive manufacturing machine controller 12.

Figure 5:
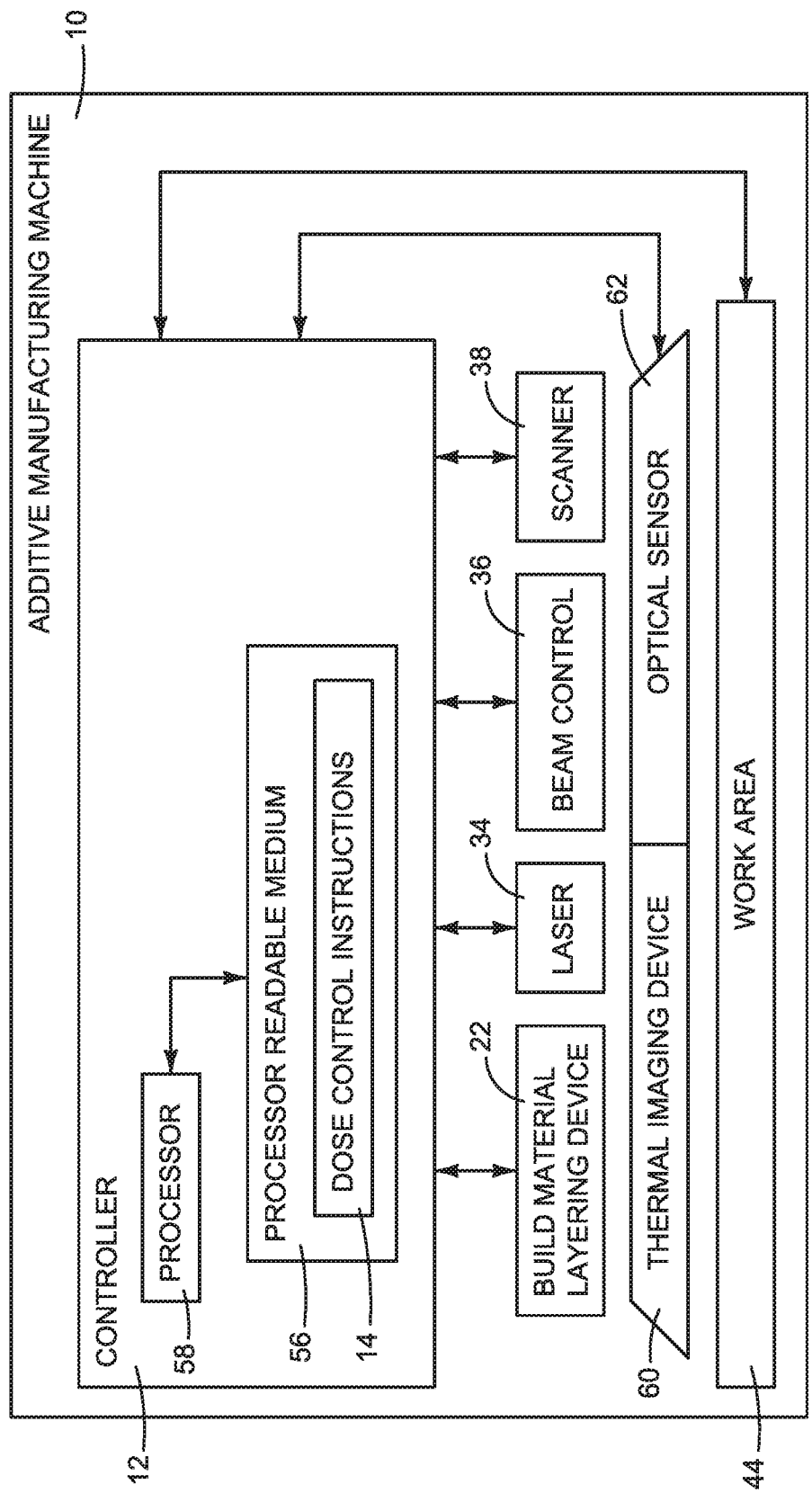
FIG. 5 is a block diagram illustrating one example of an additive manufacturing machine implementing the processor readable medium shown in FIG. 4.

FIG. 5 is a block diagram illustrating one example of an additive manufacturing machine 10 implementing a controller 12 with energy dose control instructions 14. Referring to FIG. 5, machine 10 includes controller 12, work area 44, layering device 22, laser 34, beam control system 36, and scanner 38. Build material layering device 22 layers build material over work area 44 and may include, for example, a device to dispense the build material and a blade, brush or roller to spread the build material for each layer. In this example, additive manufacturing machine 10 also includes an infrared camera or other thermal imaging device 60 to detect temperatures in work area 44 and an optical sensor 62 to sense the intensity, intensity profile, position and overlap, and/or other interesting characteristics of the laser beams. Thermal imaging device 60 and optical sensor 62 are operatively connected to controller 12 to provide feedback that may be used to modify energy dosing during manufacturing, as described above with reference to the flow diagram of FIG. 3. Controller 12 in this example includes a processor readable medium 56 with energy dose control instructions 14 and a processor 58 to read and execute instructions 14.

Figure 6:
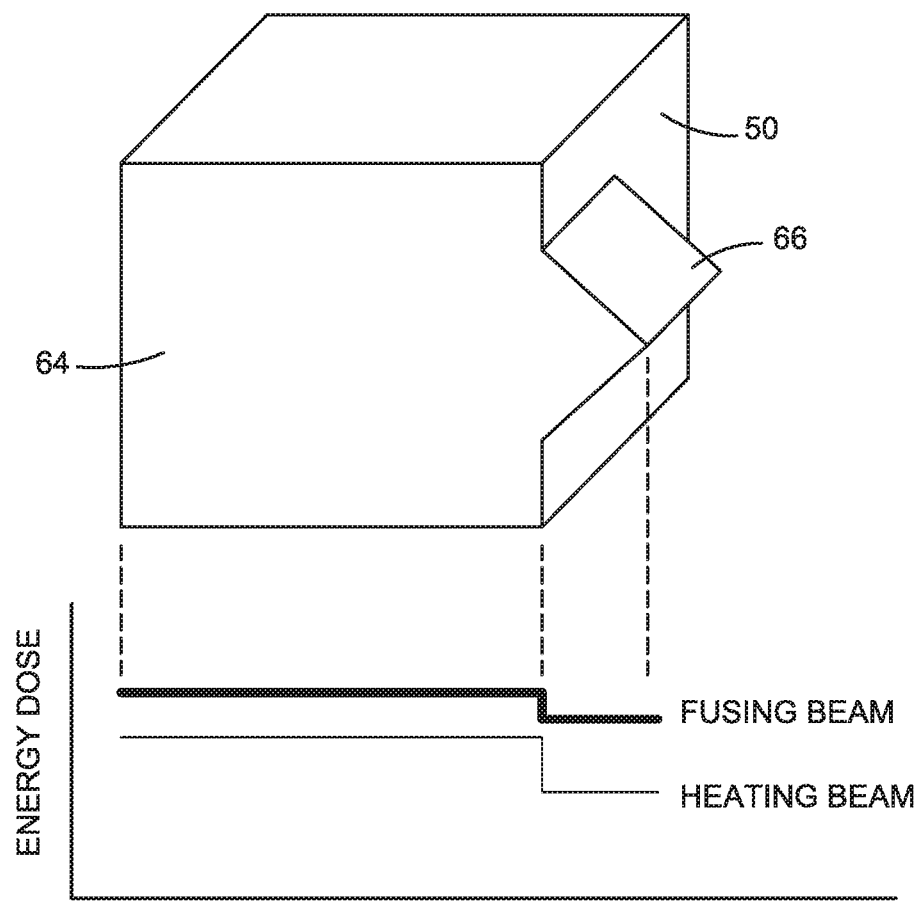
FIG. 6 is a perspective view illustrating one example of an object that includes a block and a wedge shaped overhang protruding from the side of the block.

One example implementation for fusing energy dosing will now be described with reference to FIGS. 6-12. FIG. 6 is a perspective view illustrating an object 50 that includes a block 64 and a wedge shape overhang 66 protruding from block 64. FIG. 6 also includes a graph illustrating one example for energy dosing across object 50. FIG. 7 is an elevation view showing object 50 divided into six slices. Each slice 1-6 depicts fused build material in a layer of build material and the resulting object slice during manufacturing. FIGS. 8-13 illustrate each slice 1-6 from FIG. 7 in more detail. Each of FIGS. 8-13 includes graphs illustrating one example for beam intensity, size and position to be applied across the corresponding layer of unfused build material.

Referring to FIG. 6, in this example the energy dose applied to build material in each layer drops from a higher dose across the width of object block 64 to a lower dose at overhang 66. As described below with reference to FIGS. 7-13, the fusing energy delivered by the laser beams may be varied with the geometry of each object slice by changing the intensity, size and relative position of the beam. The arrows in FIGS. 8-13 indicate the direction laser beams 40, 42 scan across each slice 1-6. Other scan patterns are possible. For example, beams 40, 42 could scan back and forth for each slice or for successive slices.

Figure 9:
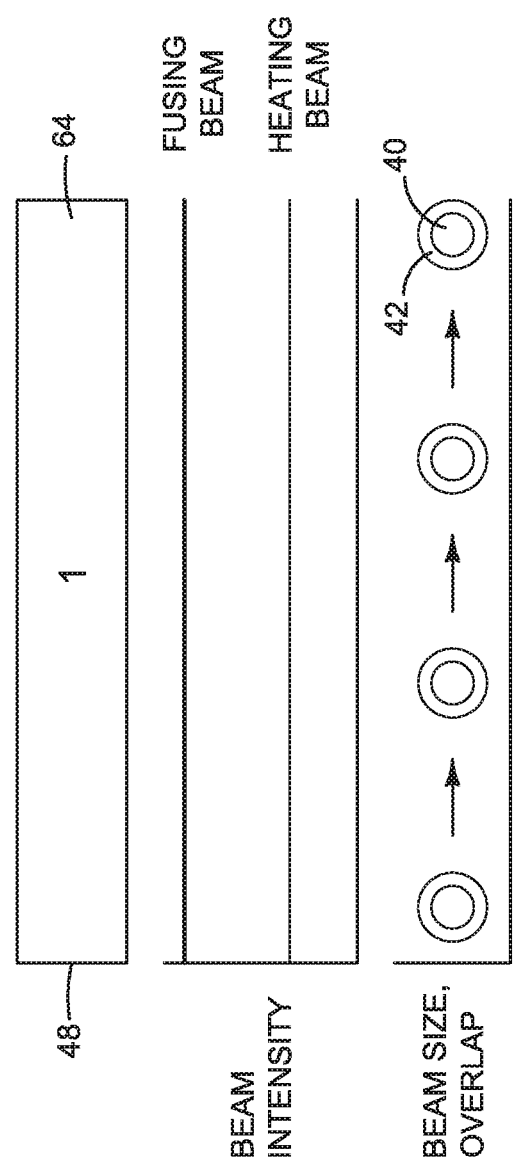
Figure 8:
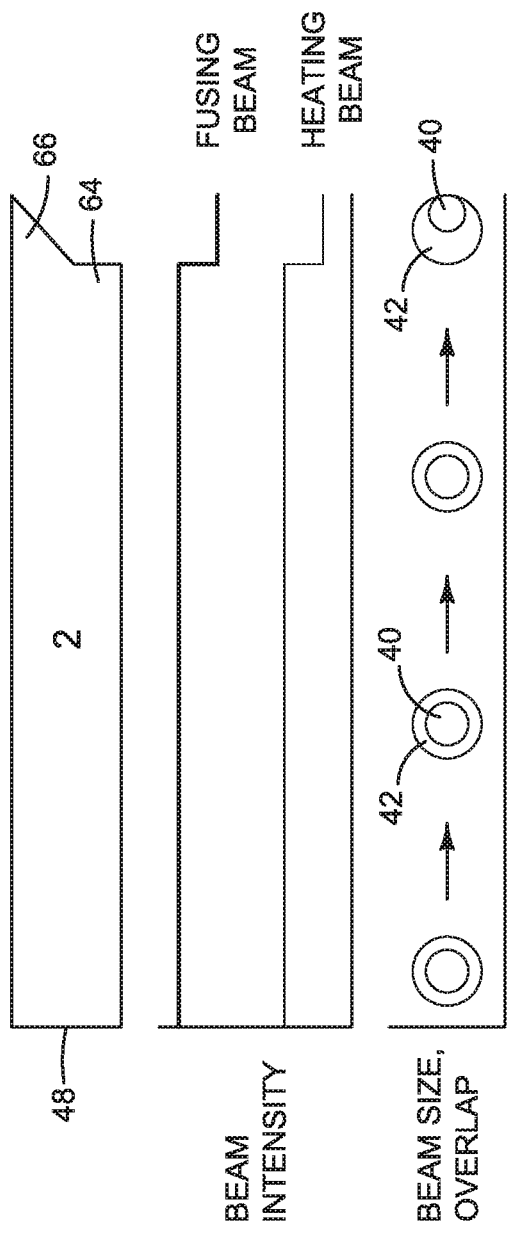
Figure 11:
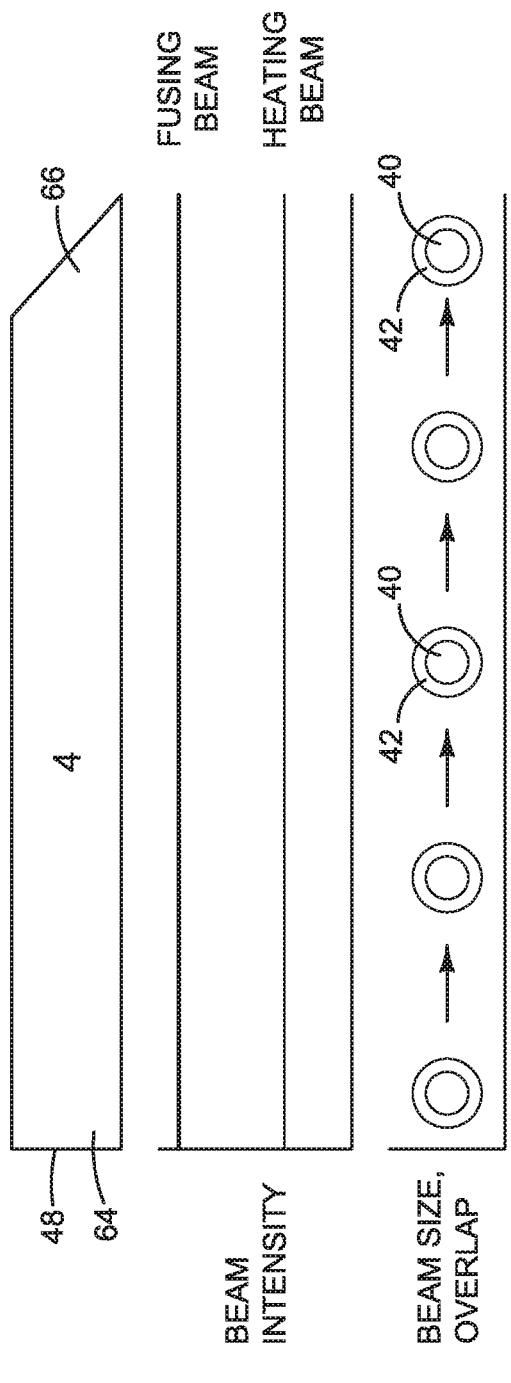
Figure 10:
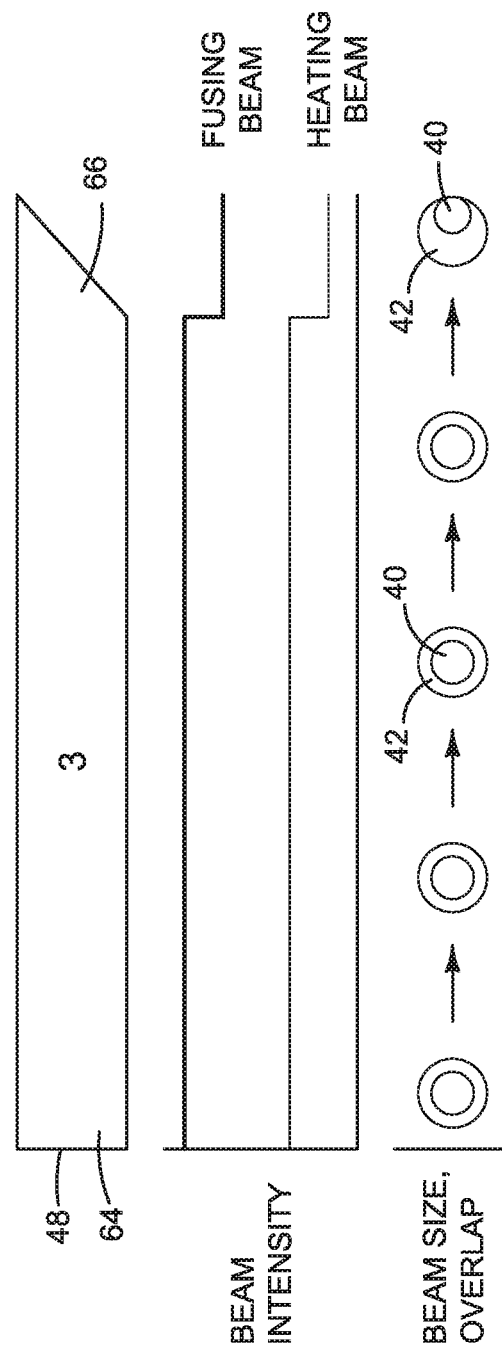

As shown in FIGS. 8 and 13, the geometry of slices 1 and 6 is uniform across its full width and the intensity, size and position of each beam 40, 42 are constant across the full width of the slice. As shown in FIGS. 9 and 10, the geometry of each slice 2 and 3 changes from block 64 to an overhang 66. In this example, the intensity of each beam 40, 42 is higher across block 64 and lower across overhang 66. The size of heating beam 42 remains constant across block 64 and overhang 66 while the size of fusing beam 40 is larger across block 64 and smaller across overhang 66, to lower the energy dose delivered to overhang 66 where there is no underlying slice material. Fusing beam 40 is centered in heating beam 42 across block 64 and off center to the right side of heating beam 42 across overhang 66, to accommodate fused build material in the overhang which cools more slowly. As shown in FIGS. 11 and 12, the geometry of each slice 4 and 5 changes from block 64 to a thinning edge 67. Although a change in energy dosage may be appropriate along a thinning edge 67, the presence of underlying slice material in this example may allow the energy dosage to remain unchanged from block 64.

FIGS. 14-18 illustrate example techniques and components that may be used to help deliver the desired energy dosages at different voxel locations, according to the energy values associated with the corresponding object voxels.

Figure 14:
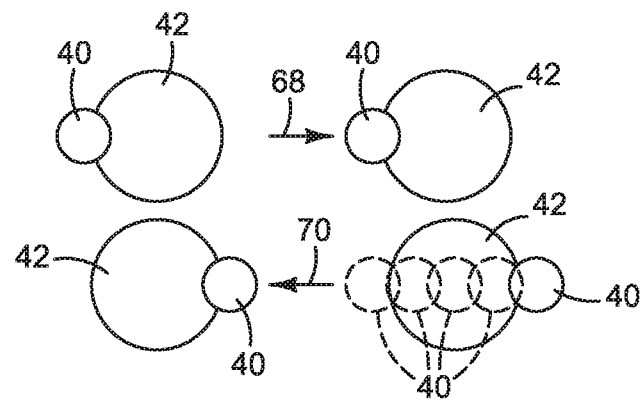

In the example shown in FIG. 14, a larger, lower intensity heating beam 42 leads a smaller, higher intensity fusing beam 40 over the work area in both directions along a bi-directional scan path. The laser beams are scanned to the right, as indicated by arrow 68, and then to left, as indicated by arrow 70. Fusing beam 40 is moved across heating beam 42 at the change in scan direction, as indicated by dashed lines, to maintain the leading position of heating beam 42, for uniform energy dosing across the work area in both directions. Also, the intensity of fusing beam 40 may be varied as it is moved over heating beam 42 from one side to the other at each change in direction to help maintain uniform energy dosing at the transition. Such uniformity may be desirable, for example, to help improve the resolution of fused build material at the edge of an object slice.

Figure 15:
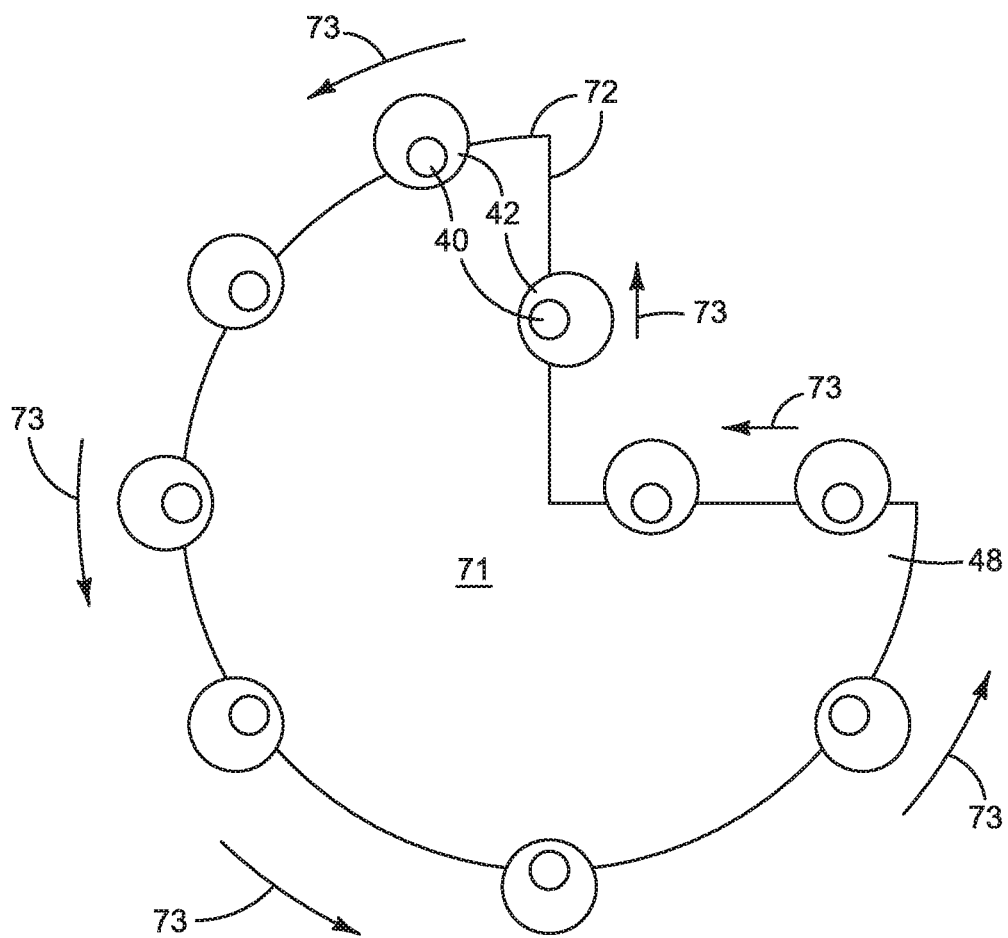

In the example shown in FIG. 15, the scan path for beams 40, 42 follows the perimeter edge 72 of an object slice 48, as indicated by arrows 73. The position of the beams is adjusted such that the position of the beams with respect to the scan path remains constant, to maintain uniform energy dosing along edge 72. Perimeter scanning with a fusing beam 40 following heating beam 42 in a constant orientation may be desirable, for example, for higher resolution fusing along an edge or other structural feature. The bulk 71 of slice 48 may be fused scanning beams 40, 42 back and forth over the work, for example with higher intensity and at faster speeds to reduce cycle time.

Figure 16:
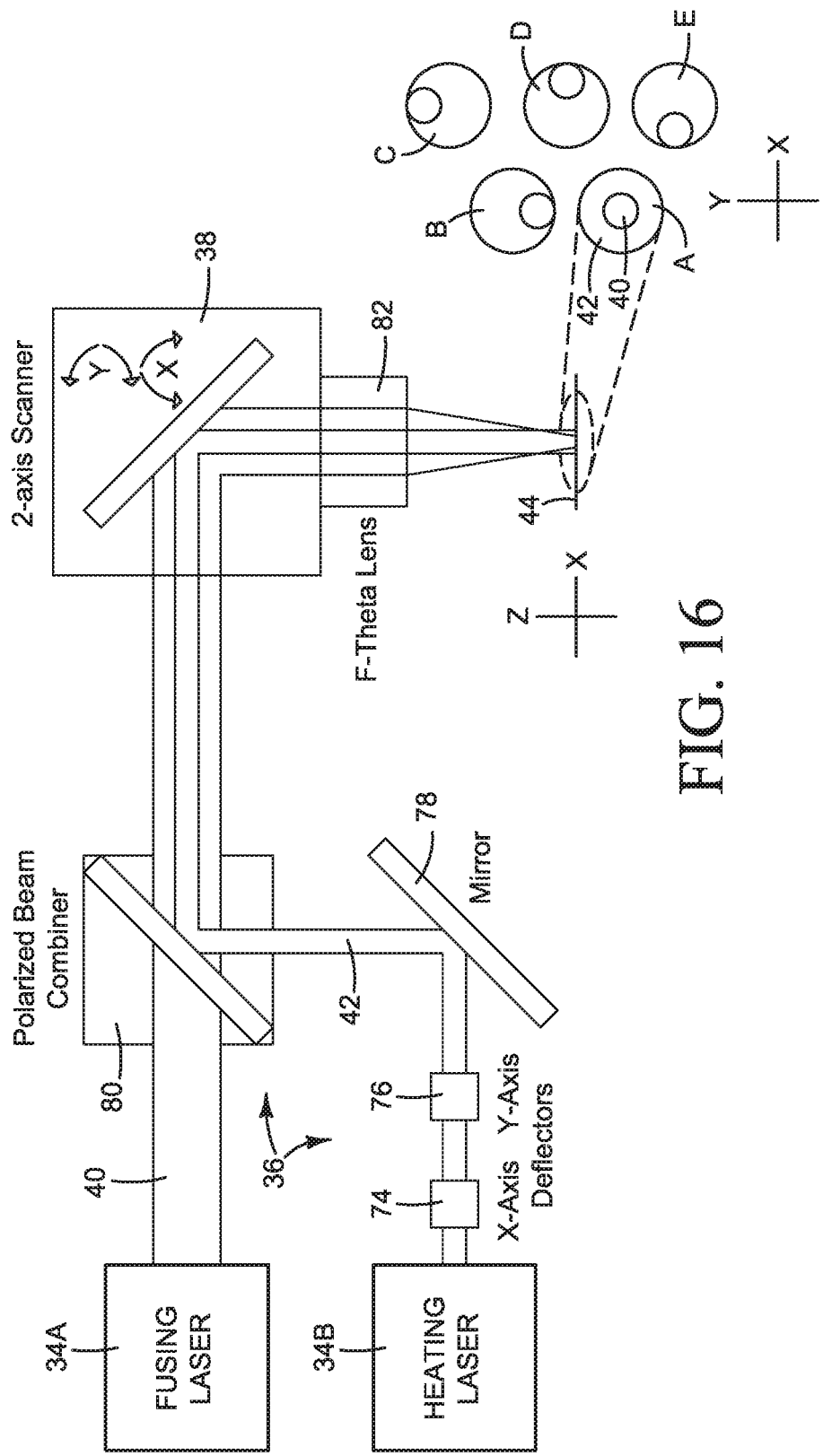

In the example shown in FIG. 16, laser 34 in FIGS. 1 and 5 is implemented with two lasers, a fusing laser 34A and a heating laser 34B, and beam control system 36 includes x and y axis deflectors 74, 76, mirror 78, beam combiner 80 and lens 82. In this example, the relative position of beams 40, 42 is controlled with deflectors 74, 76. In other examples, an adjustable or scanning mirror 78 may be used to position beam 42 instead of deflectors 74, 76. Beams 40, 42 are joined before scanner 38 with a polarized beam combiner 80 and focused through an F-theta lens 82 to achieve the desired intensity profile at work area 44. In this example, the relative position of the beams at work area 44 changes while the size of each beam remains the same. Five possible laser spot configurations are shown in FIG. 16: fusing beam 40 centered in heating beam 42 (A); fusing beam 40 offset to the outside of heating beam 42 in the Y direction (B, C); and fusing beam 40 offset to the outside of heating beam 42 in the X direction (D, E). A changing spot configuration such as those shown in FIG. 16 may be desirable, for example, to adjust preheating and/or post heating characteristics for a particular set of material properties.

Figure 17:
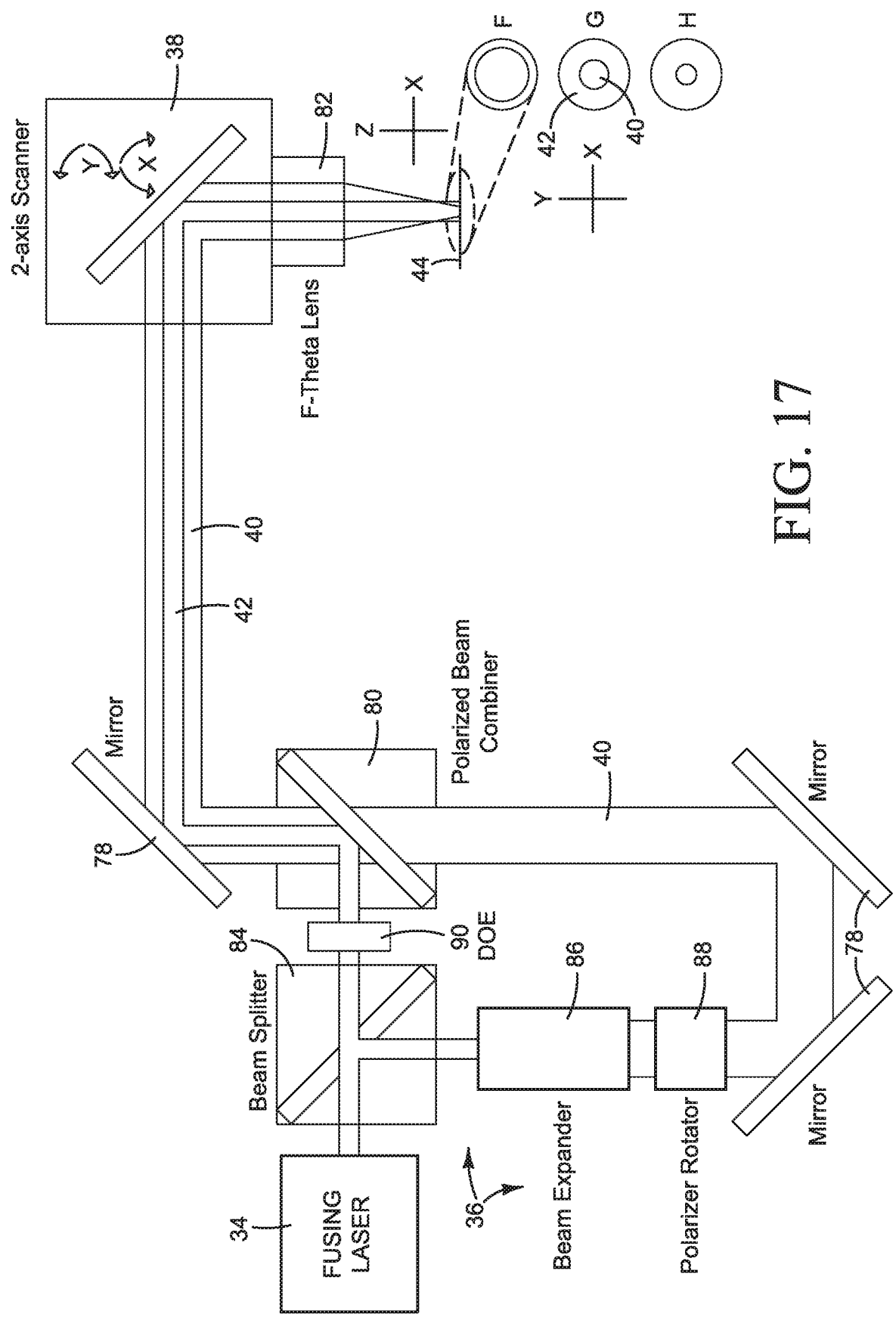

In the example shown in FIG. 17, laser 34 in FIGS. 1 and 5 is implemented as a single laser 34 and beam control system 36 includes a beam splitter 84, a beam expander 86, a polarizer rotator 88, mirrors 78, a diffractive optical element 90, and a beam combiner 80. A main beam is split into a fusing beam 40 and a heating beam 42 at beam splitter 84. Fusing beam 40 undergoes expansion and rotation before being joining heating beam 42 at combiner 80. The intensity profile and/or the shape of heating beam 42 is adjusted at diffractive optical element 90 before joining fusing beam 40 at combiner 80. Both beams 40, 42 are scanned through lens 82 to achieve the desired intensity profile at work area 44. In this example, the size of the fusing beam changes while the relative position of the two beams at work area 44 remains the same. Three possible laser spot configurations are shown in FIG. 17: a larger fusing beam 40 centered in heating beam 42 (F); a smaller fusing beam 40 centered in heating beam 42 (G); and an even smaller fusing beam 40 centered in heating beam 42 (H). A changing spot configuration such as those shown in FIG. 17 may be desirable, for example, to adjust fusing and pre/post heating characteristics for different material properties and for edge control or other high resolution features (or low resolution features).

Figure 18:
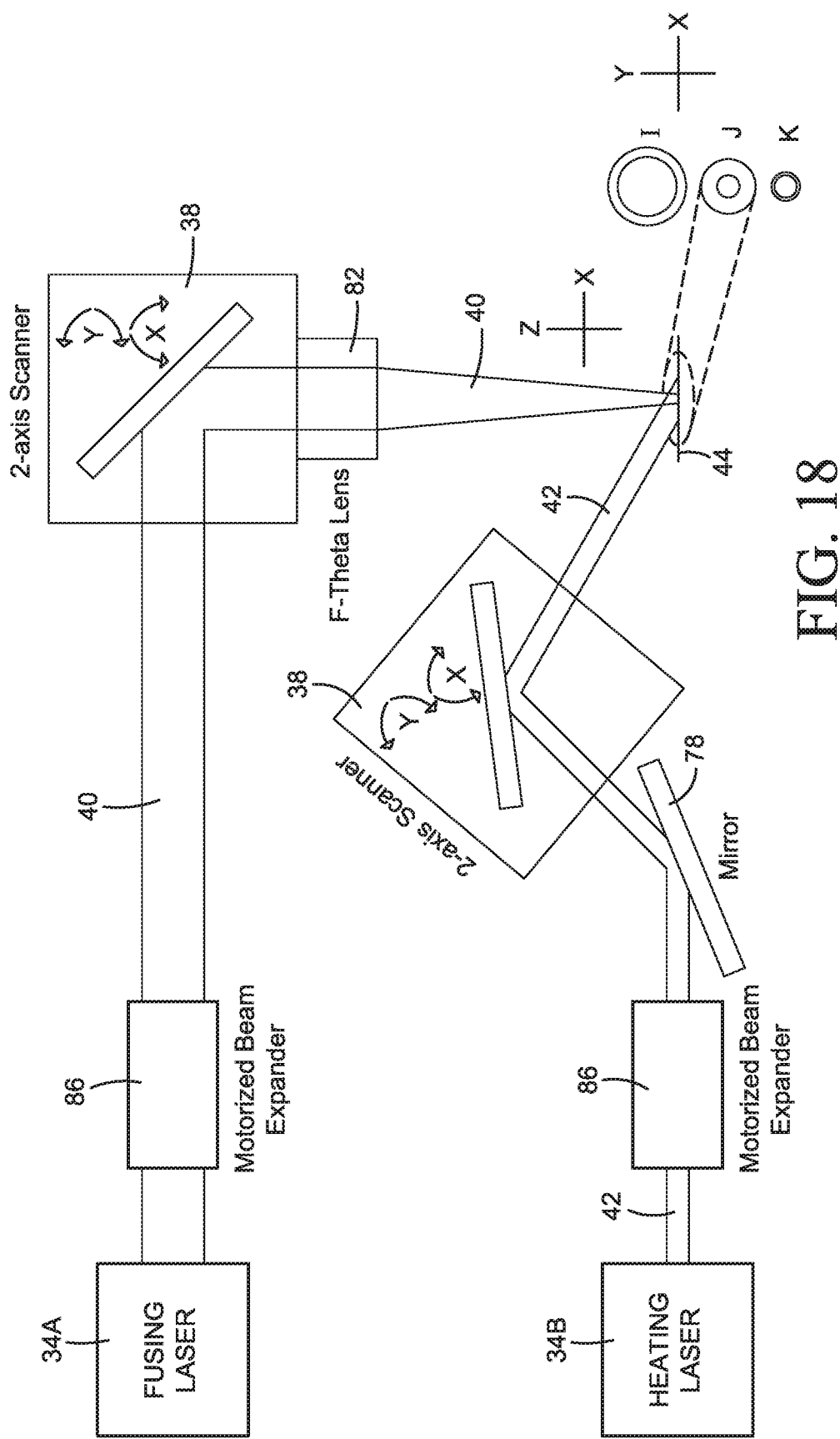

In the example shown in FIG. 18, laser 34 in FIGS. 1 and 5 is implemented with two lasers, a fusing laser 34A and a heating laser 34B, and beam control system 36 includes beam expanders 86, mirror 78, and a lens 82. In this example, each beam 40, 42 undergoes expansion before being scanned separately on to work area 44. In this example, the size of both beams changes at work area 44 while the relative position of the beams remains the same. Three possible laser spot configurations are shown in FIG. 18: a larger fusing beam 40 centered in a larger heating beam 42 (I); a smaller fusing beam 40 centered in a smaller heating beam 42 (J); and an even smaller fusing beam 40 centered in an even smaller heating beam 42 (K). A changing spot configuration such as those shown in FIG. 18 may be desirable, for example, to adjust fusing and pre/post heating characteristics for different material properties and for edge control or other high resolution features (or low resolution features).

Other example techniques and components may be used to help deliver the desired energy doses at different voxel locations. Although the shape of the laser beams at the work area are circular in the examples shown in the figures, other shapes are possible. Oval and/or square beam shapes may be desirable in some examples. Similarly, examples are not limited to two laser beams. More or fewer laser beams could be used.

As noted above, the examples shown in the figures and described herein illustrate but do not limit the scope of the patent, which is defined in the following Claims.

"A", "an" and "the" used in the claims means one or more.

The invention claimed is:

1. A processor readable medium having instructions thereon that when executed cause an additive manufacturing machine to:
    irradiate fusible build material in a layer of fusible build material with a fusing laser beam and a heating laser beam overlapping the fusing laser beam, the heating laser beam having a larger spot size and a lower intensity than the fusing laser beam;
    vary an intensity, spot size, and/or overlap of the laser beams at multiple different voxel locations in the layer of build material according to an energy dosage to be applied at each voxel location in an object slice, including multiple different energy dosages for corresponding multiple different voxel locations in the slice; and
    adjust a position of the laser beams along a scan path that follows a perimeter edge of the object slice such that the position of each laser beam with respect to the scan path along the perimeter edge remains constant.

2. The processor readable medium of claim 1, where each energy dosage is represented by an energy value associated with each voxel of the object slice.

3. The processor readable medium of claim 2, having instructions thereon that when executed cause the additive manufacturing machine to associate the energy value with each of the voxels of the object slice.

4. An additive manufacturing machine controller implementing the processor readable medium of claim 3.

5. An additive manufacturing process, comprising:
    irradiating fusible build material in a layer of fusible build material with a fusing laser beam and a heating laser beam overlapping the fusing laser beam the heating laser beam having a larger spot size and a lower intensity than the fusing laser beam;
    varying an intensity, spot size, and/or overlap of the laser beams at multiple different voxel locations in the layer of build material according to an energy value associated with each voxel of an object slice, including multiple different energy values for corresponding multiple different voxels;
    adjusting a position of the laser beams along a scan path that follows a perimeter edge of an object slice such that the position of each laser beam with respect to the scan path along the perimeter edge remains constant; and
    repeating the irradiating, varying, and adjusting for successive layers of build material.

6. The process of claim 5, comprising associating the energy value with each of the voxels of the object slice.

7. The process of claim 6, where each energy value represents an energy dosage to be applied at the voxel location associated with the energy value.

8. The process of claim 5, comprising:
    detecting a characteristic of the laser beams and/or a temperature of fused build material;
    based on the detecting, changing the energy values associated with some or all of the voxels; and then
    varying the intensity, spot size and/or overlap of the laser beams according to the changed energy values.

9. The process of claim 5, where:
    the irradiating includes scanning the laser beams over the build material; and
    the varying includes varying the speed at which the laser beams are scanned over the build material.

10. The process of claim 5, where the varying includes varying the intensity and the spot size of the fusing laser beam and/or the heating laser beam at multiple different voxel locations in the build material.

11. The process of claim 5, where the irradiating includes scanning the laser beams across the build material with the heating laser beam leading the fusing laser beam across the build material in two directions.

12. An additive manufacturing machine, comprising:
    a layering device to layer build material over a work area;

a laser to generate a first laser beam and a second laser beam overlapping the first laser beam, the second laser beam having a larger spot size and a lower intensity than the first laser beam;

a scanner to scan the first laser beam over the work area at a first scan speed and to scan the second laser beam over the work area at a second scan speed;

optical elements between the laser and the scanner to adjust an intensity, spot size, and position of the laser beams; and a controller operatively connected to the laser, the scanner and the optical elements to vary an intensity, spot size, overlap, and/or scan speed of the laser beams at multiple different voxel locations in a layer of build material according to an energy dosage associated with each voxel location of an object slice and to adjust a position of the laser beams along a scan path that follows a perimeter edge of the object slice such that the position of each laser beam with respect to the scan path along the perimeter edge remains constant.

13. The machine of claim 12, comprising an optical sensor to measure the intensity of one or both laser beams, the controller operatively connected to the optical sensor to change the energy dosages associated with some or all of the voxel locations based on optical sensor measurements and then vary the intensity, spot size, overlap and/or scan speed of the laser beams according to the changed energy dosages.

14. The machine of claim 13, comprising a thermal sensor to measure the temperature of fused and/or unfused build material in the work area, the controller operatively connected to the thermal sensor to change the energy dosages associated with some or all of the voxel locations based on thermal sensor measurements and then vary the intensity, spot size, overlap and/or scan speed of the laser beams according to the changed energy dosages.

* * * * *